(12) United States Patent
Tonogai et al.

(10) Patent No.: US 12,377,547 B2
(45) Date of Patent: Aug. 5, 2025

(54) CONTROL DEVICE, ROBOT, CONTROL METHOD, AND PROGRAM

(71) Applicant: OMRON Corporation, Kyoto (JP)

(72) Inventors: Norikazu Tonogai, Kyoto (JP); Shinya Matsumoto, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 211 days.

(21) Appl. No.: 18/246,874

(22) PCT Filed: Sep. 3, 2021

(86) PCT No.: PCT/JP2021/032520
§ 371 (c)(1),
(2) Date: Mar. 28, 2023

(87) PCT Pub. No.: WO2022/091578
PCT Pub. Date: May 5, 2022

(65) Prior Publication Data
US 2023/0364795 A1   Nov. 16, 2023

(30) Foreign Application Priority Data
Oct. 26, 2020   (JP) ................. 2020-179106

(51) Int. Cl.
*B25J 9/16*   (2006.01)
(52) U.S. Cl.
CPC .......... *B25J 9/1694* (2013.01); *B25J 9/1664* (2013.01)
(58) Field of Classification Search
CPC ...... B25J 9/1694; B25J 9/1664; B25J 9/1676; B25J 9/1697; B25J 19/021; B25J 9/1628;
(Continued)

(56) References Cited

U.S. PATENT DOCUMENTS 10,359,287 B2 * 7/2019 Kreienheder .......... G05D 1/104
2004/0249504 A1   12/2004 Gutmann et al.
(Continued)

FOREIGN PATENT DOCUMENTS

JP   2003166824 A   6/2003
JP   2003266345 A   9/2003
(Continued)

OTHER PUBLICATIONS

Xia et al, "Environmental Complexity Measurement Using Shannon Entropy", Mar. 2020 (Year: 2020).*
(Continued)

*Primary Examiner* — Abby Y Lin
*Assistant Examiner* — Esvinder Singh
(74) *Attorney, Agent, or Firm* — ROSSI, KIMMS & McDOWELL LLP (57) ABSTRACT

A control apparatus for a robot including a three-dimensional sensor includes an operation controller that controls the robot to shift a measurement range of the three-dimensional sensor in a scan area, and a map obtainer that updates map information based on a result of measurement performed by the three-dimensional sensor. The map information indicates a scan status at each of a plurality of points in the scan area. The operation controller performs first scanning in which the measurement range of the three-dimensional sensor is shifted to update map information about a local range in the scan area, and performs second scanning in which the measurement range of the three-dimensional sensor is shifted away from the local range to update map information about a range different from the local range for which the first scanning is performed to update map information.

16 Claims, 7 Drawing Sheets

(58) Field of Classification Search
CPC ...... B25J 9/1656; B25J 9/1666; B25J 9/1674; B25J 19/022; G05B 2219/40613; G05B 2219/36481; G05B 2219/37425; G05B 2219/40548; G05B 2219/4703; G05B 2219/49387

See application file for complete search history.

(56) References Cited

U.S. PATENT DOCUMENTS

| | | | |
|---|---|---|---|
| 2018/0157230 A1 | 6/2018 | Matsushima | |
| 2018/0189565 A1* | 7/2018 | Lukierski | ............... B25J 9/1697 |
| 2020/0125113 A1* | 4/2020 | Eoh | ..................... G06F 18/2413 |
| 2020/0225673 A1* | 7/2020 | Ebrahimi Afrouzi | ........................ A47L 11/4011 |
| 2022/0011119 A1* | 1/2022 | Pandit | .................... A01G 25/16 |
| 2022/0398760 A1 | 12/2022 | Matsumoto | |

FOREIGN PATENT DOCUMENTS

| | | |
|---|---|---|
| JP | 2013033356 A | 2/2013 |
| JP | 2018089728 A | 6/2018 |
| WO | 2020183711 A1 | 9/2020 |

OTHER PUBLICATIONS

Extended European search report issued in European Appln. No. 21885697.9 mailed on Oct. 14, 2024.

Paul et al. "Autonomous robot manipulator-based exploration and mapping system for bridge maintenance", Robotics and Autonomous Systems. 2011: pp. 543-554. vol. 59, No. 7-8. Cited in NPL 1.

International Search Report issued in Intl. Appln. No. PCT/JP2021/032520 mailed Nov. 16, 2021. English translation provided.

Written Opinion issued in Intl. Appln. No. PCT/JP2021/032520 mailed Nov. 16, 2021. English translation provided.

\* cited by examiner

CONTROL DEVICE, ROBOT, CONTROL METHOD, AND PROGRAM

TECHNICAL FIELD

The present invention relates to a control apparatus, a robot, a control method, and a program.

BACKGROUND

At manufacturing or other sites, known robots or other machines move within preset movable ranges for safe operation.

Patent Literature 1 describes a robot control apparatus that sets the movable range of a robot to avoid contact with an object such as peripheral equipment. The robot control apparatus in Patent Literature 1 defines an area including an object (contact area) by obtaining depth data at each point on the surface of the object using a depth sensor (a three-dimensional or 3D sensor) on the robot.

PRIOR ART DOCUMENTS

Patent Document

Patent Literature 1: Japanese Unexamined Patent Application Publication No. 2018-089728

SUMMARY OF THE INVENTION

Problems to be Solved by the Invention

The robot control apparatus in Patent Literature 1 obtains depth data with the depth sensor moving while the posture of the robot is being changed. Based on the depth data, the robot control apparatus defines an area including an object (contact area). Patent Literature 1 does not describe determining the position of the depth sensor. With this apparatus, a user determines the position of the depth sensor by, for example, referring to the obtained depth data.

In response to the above, the area to be scanned (scan area) may be divided into a grid and is entirely scanned with the sensor moving sequentially from an end along the grid. However, this method takes time to scan the scan area and is inefficient.

One or more aspects of the present invention are directed to efficient scanning of an area.

Means for Solving the Problem

The apparatus, the robot, the method, and the program according to one or more aspects of the present invention have the structure below.

A control apparatus according to one aspect of the present invention is a control apparatus for a robot including a three-dimensional sensor. The control apparatus includes an operation controller that controls the robot to shift a measurement range of the three-dimensional sensor in a scan area, and a map obtainer that updates map information based on a result of measurement performed by the three-dimensional sensor. The map information indicates a scan status at each of a plurality of points in the scan area. The operation controller performs first scanning in which the measurement range of the three-dimensional sensor is shifted to update map information about a local range in the scan area, and performs second scanning in which the measurement range of the three-dimensional sensor is shifted away from the local range to update map information about a range different from the local range for which the first scanning is performed to update map information.

With this structure, the three-dimensional sensor is controlled to switch between the local scan and the global scan to scan an effective range. This allows more efficient scanning of the scan area.

In the above control apparatus, in the first scanning, the operation controller may perform at least one of shifting the measurement range of the three-dimensional sensor to a range overlapping a most recent measurement range, shifting the measurement range of the three-dimensional sensor based on entropy indicating reliability of determination as to whether an object is included in the measurement range, or shifting the measurement range of the three-dimensional sensor based on a number of undetermined-subareas located between the three-dimensional sensor and an object subarea in a viewing range of the three-dimensional sensor, where the undetermined-subarea is a subarea undetermined to include or undetermined not to include an object in the scan area, and the object subarea is a subarea determined to include an object in the scan area. This facilitates precise scanning of a certain range in the first scanning, or in other words, facilitates the local scan.

In the above control apparatus, in the second scanning, the operation controller may perform at least one of shifting the measurement range of the three-dimensional sensor to a range not overlapping a most recent measurement range, shifting the measurement range of the three-dimensional sensor based on a number of undetermined-subareas in a viewing range of the three-dimensional sensor, where the undetermined-subarea is a subarea undetermined to include or undetermined not to include an object in the scan area, or shifting the measurement range of the three-dimensional sensor based on mobility of the robot to move the three-dimensional sensor. This facilitates rough scanning of a wider range in the second scanning than in the first scanning, or in other words, facilitates the global scan.

In the above control apparatus, in the first scanning, the operation controller may shift the measurement range of the three-dimensional sensor to a range overlapping a most recent measurement range. In the second scanning, the operation controller may shift the measurement range of the three-dimensional sensor to a range not overlapping the most recent measurement range. With this structure, the first scanning allows measurement in the most recent measurement range and its adjacent ranges, and the second scanning allows measurement in ranges farther from the most recent measurement range. This allows more efficient scanning.

In the above control apparatus, the map information may indicate, as the scan status, at least whether a subarea corresponding to each of the plurality of points in the scan area is a determined-subarea determined to include or determined not to include an object or an undetermined-subarea undetermined to include or undetermined not to include an object.

The operation controller may perform the first scanning in response to a degree of updating of the map information performed by the map obtainer being greater than a threshold, and perform the second scanning in response to the degree of updating being less than or equal to the threshold. The degree of updating may include a number of undetermined-subareas updated to determined-subareas. This structure performs the first scanning when the map for a certain measurement range is updated sufficiently, and otherwise performs the second scanning. This allows efficient updating of map information. More specifically, when a certain measurement range is scanned but has less updating of map information, the three-dimensional sensor is controlled to perform the second scanning to scan another range. This allows efficient updating of map information.

In the above control apparatus, in the first scanning, the operation controller may shift the measurement range of the three-dimensional sensor to a range including a largest number of undetermined-subareas of a plurality of ranges each overlapping a most recent measurement range. This structure performs control to scan, with higher priority, a range that has undergone insufficient scanning. This allows more effective scanning.

In the above control apparatus, the map information may include information about reliability of determination as to whether an object is included in the subarea corresponding to each of the plurality of points. In the first scanning, the operation controller may shift the measurement range of the three-dimensional sensor to a range with a highest representative value of entropy of a plurality of ranges each overlapping a most recent measurement range. The entropy may have a greater value for the reliability having a value closer to 0.5. The representative value may be an average, a median, or a mode. This structure uses more information (more precise information) to determine a range that has undergone insufficient scanning, and performs control to scan the determined range with higher priority. This allows more effective scanning.

In the above control apparatus, in the second scanning, the operation controller may shift the measurement range of the three-dimensional sensor based on a number of undetermined-subareas in a viewing range of the three-dimensional sensor at each of a plurality of candidate positions. This structure performs control to scan, with higher priority, a range that has undergone insufficient scanning. This allows more effective scanning.

In the above control apparatus, in the second scanning, the operation controller may shift the measurement range of the three-dimensional sensor to a viewing range of the three-dimensional sensor including a largest number of undetermined-subareas of a plurality of viewing ranges of the three-dimensional sensor at the plurality of candidate positions.

In the above control apparatus, the map information may indicate whether the determined-subarea is an object subarea determined to include an object or an empty subarea determined not to include an object. In the second scanning, the operation controller may shift the measurement range of the three-dimensional sensor to, of a plurality of viewing ranges of the three-dimensional sensor at the plurality of candidate positions, a viewing range of the three-dimensional sensor including a largest number of undetermined-subareas between the three-dimensional sensor and an object subarea. With no object subarea located farther than undetermined-subareas from the three-dimensional sensor, the three-dimensional sensor cannot use an object subarea as a reference for scanning. With no such object subarea, scanning undetermined-subareas can be less effective than with an object subarea. The above structure can shift the measurement range to a range in which scanning can be more effective.

In the above control apparatus, in the second scanning, the operation controller may shift the measurement range of the three-dimensional sensor further based on mobility of the robot to move the three-dimensional sensor. This allows the three-dimensional sensor to move more efficiently and thus scan the scan area faster.

In the above control apparatus, the map obtainer may obtain the map information as initial information based on a result of measurement performed by the three-dimensional sensor for a subarea corresponding to each of the plurality of points in the scan area. This structure allows reliable scanning of each individual subarea to produce precise map information as initial information.

In the above control apparatus, the map obtainer may obtain the map information as initial information based on a result of measurement performed by the three-dimensional sensor for a plurality of ranges in the scan area not overlapping each other. This eliminates scanning of overlapping ranges and thus more efficiently produces map information as initial information.

A robot may include the above control apparatus and a three-dimensional sensor that measures a scan area.

One or more aspects of the present invention may be directed to an apparatus including at least one of the above elements, or to an electronic device, a control system, a scan system, or a scan device. One or more aspects of the present invention may also be directed to a control method for a robot including at least one of the above processes, or to an area defining method or a scan method. One or more aspects of the present invention may be directed to a program for implementing any of these methods or to a non-transitory storage medium storing the program. The above elements and processes may be combined with one another in any manner to form one or more aspects of the present invention.

Effect of the Invention

The apparatus, the robot, the method, and the program according to the above aspects of the present invention allow efficient scanning of an area.

MODE FOR CARRYING OUT THE INVENTION

Embodiments of the present invention will now be described with reference to the drawings.

Application Example

A scan system 1 including a control apparatus 30 will now be described. The scan system 1 measures (scans) a scan area 50 with a three-dimensional (3D) sensor 20 at multiple measurement positions to define an area including an object (contact area) in the scan area 50. After the contact area is defined, for example, a robot 10 can avoid the contact area and move in the scan area 50 without coming in contact with the object. A machine other than the robot 10 can also move in the scan area 50 without coming in contact with the object. Each measurement position herein refers to the 3D coordinates and the orientation (optical axis direction) of the 3D sensor 20.

The scan system 1 performs an initial scan to roughly determine the status of the scan area 50. After the initial scan, the scan system 1 updates map information indicating the measurement status (scan status) at each point in the scan area 50, for example, for every measurement process for the scan area 50. The scan system 1 performs the global scan when, for example, the degree of updating of map information is less than or equal to a predetermined threshold through measurement of a certain range. The global scan refers to measurement in a range that is away from the above range and has undergone insufficient measurement. The scan system 1 performs the local scan when the degree of updating of map information is greater than the predetermined threshold through measurement of a certain range. The local scan refers to measurement in a range overlapping the above range.

The scan system 1 with this structure performs measurement, with higher priority, in a range that has undergone insufficient measurement (a range with lower reliability of determination as to whether an object is included in the range). This allows efficient measurement (scanning) of the scan area 50 and faster determination of the contact area.

First Embodiment

[Structure of Scan System]

Figure 1:
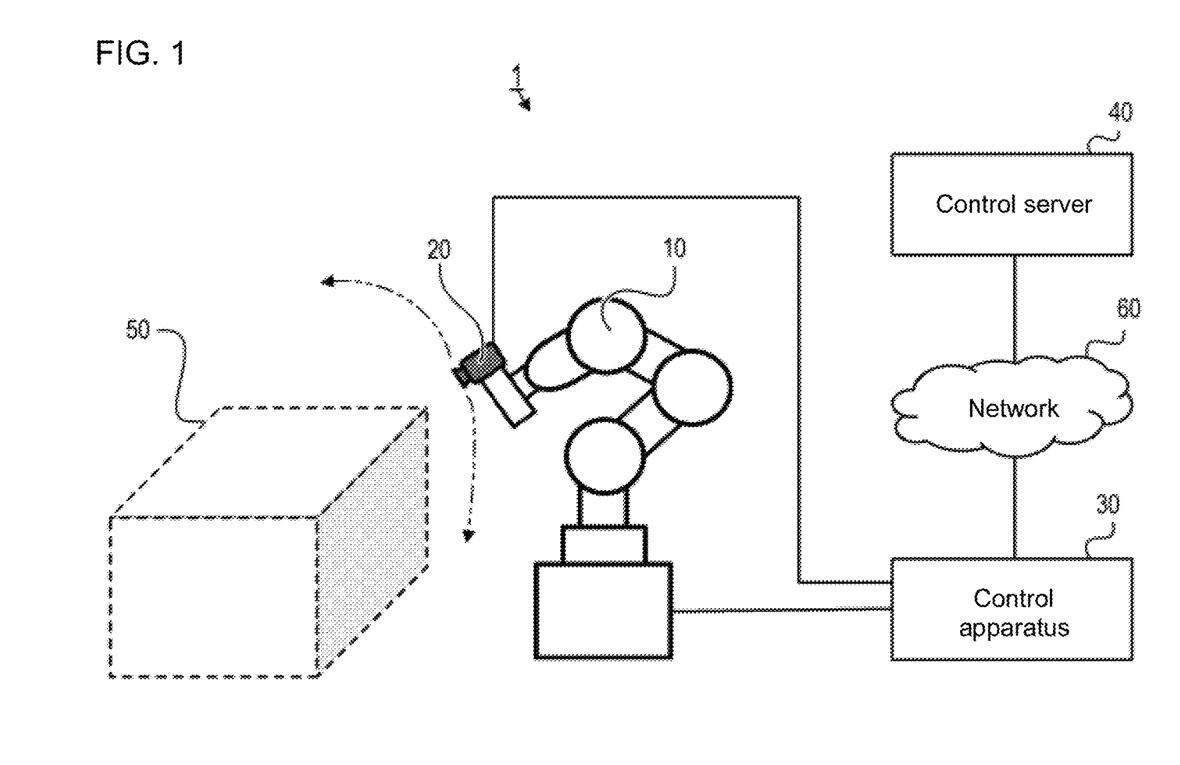
FIG. 1 is a schematic diagram of a scan system.

The scan system 1 according to the first embodiment will now be described with reference to the system diagram of FIG. 1. The scan system 1 includes the robot 10, the 3D sensor 20, the control apparatus 30, and a control server 40.

The robot 10 changes the posture to move the 3D sensor 20. The robot 10 may be any robot such as a vertically articulated robot, a mover robot, a parallel link robot, or a linear robot. In the present embodiment, the robot 10 is an articulated robot that includes an arm with multiple joints and controls the angle of each joint to control the position (orientation) of the 3D sensor 20. Each joint includes a drive shaft drivable by a motor to rotate the arm.

The 3D sensor 20 measures (scans) the scan area 50 and obtains 3D information (point cloud data) about the scan area 50. The 3D sensor 20 is located at the end of the arm in the robot 10. In other words, the 3D sensor 20 is included in the robot 10. The 3D sensor 20 is, for example, a depth sensor that obtains depth information or a range image sensor that obtains range images. The 3D sensor 20 repeatedly measures (scans) the scan area 50 at different measurement positions to define the contact area in the scan area 50. The 3D sensor 20 may include a camera (imager) to capture (obtain) two-dimensional (2D) images, in addition to obtaining 3D information. The 3D sensor 20 may also include an illuminator for illuminating the scan area 50 with light or a projector for projecting an image to the scan area 50.

The 3D sensor 20 may use either an active method or a passive method to calculate the distance from the 3D sensor 20 to an object in the scan area 50. The active method is to calculate the distance by projecting light from the 3D sensor 20 onto an object and receiving reflected light from the object. The passive method is to calculate the distance by receiving light from an object illuminated with natural or other light. The active method may include, for example, projecting infrared light to an object with a projector, receiving infrared light reflected from the object with a camera, and calculating the distance to the object based on the principle of triangulation (a method using spotlight, or a time-of-flight or TOF method). The active method may include, for example, projecting a pattern image onto an object with a projector, capturing the pattern image on the object with a camera, and calculating the distance to the object based on distortion of the captured pattern image. The passive method may include capturing two images of an object at two different positions and calculating the distance based on the difference between the two images.

The control apparatus 30 controls the robot 10 and the 3D sensor 20. The control apparatus 30 controls the posture (the movement or the arm joint angles) of the robot 10 to control the measurement position (the orientation or viewpoint) of the 3D sensor 20. The control apparatus 30 also controls the time for measurement performed by the 3D sensor 20. Further, the control apparatus 30 defines the contact area based on the results of measurement performed by the 3D sensor 20.

The control server 40 controls multiple control apparatuses 30 with a network 60. The control server 40 may include some or all of the components included in each control apparatus 30.

[Structure of Control Apparatus]

Figure 2:
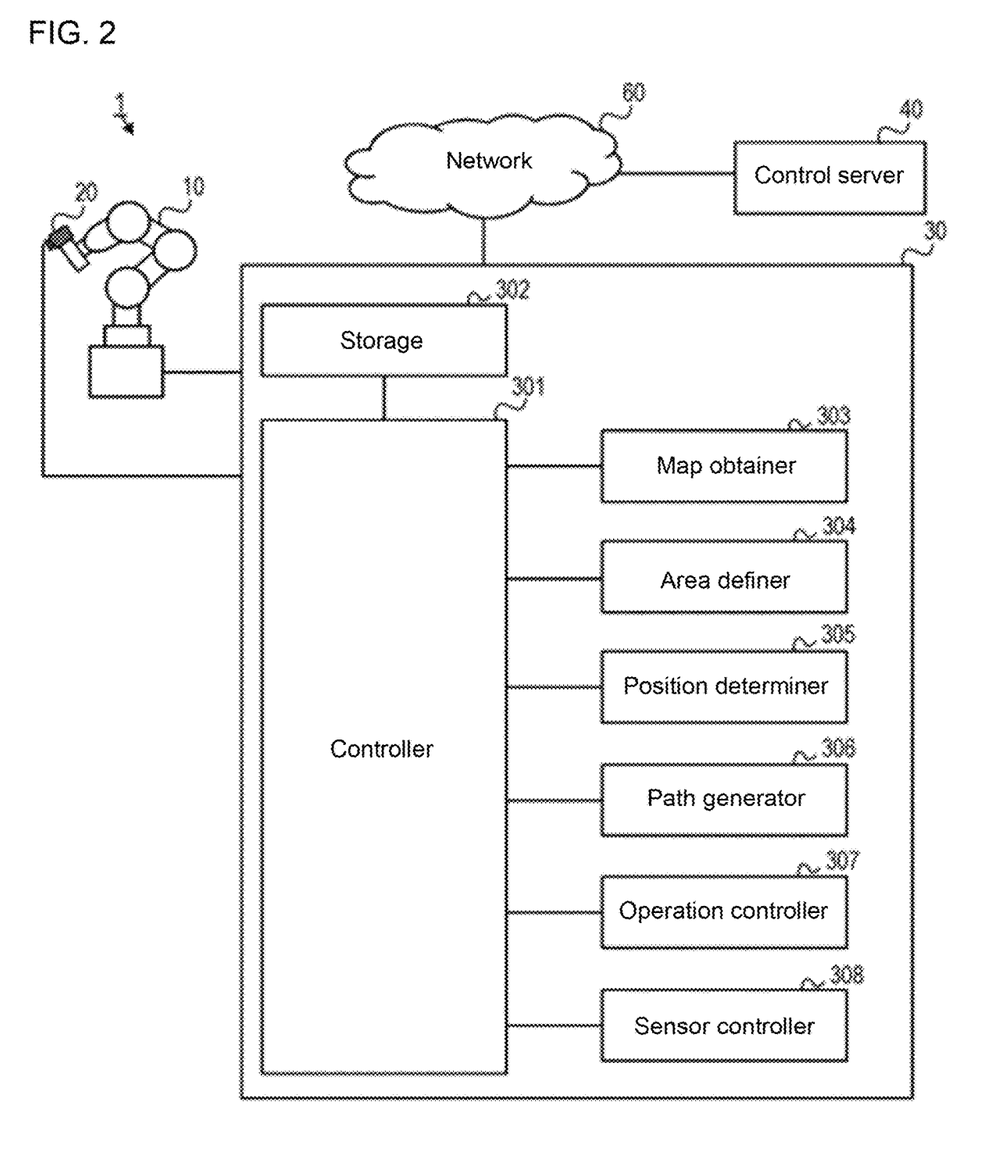
FIG. 2 is a block diagram of a control apparatus, showing its internal structure.

The internal structure of the control apparatus 30 will now be described with reference to the block diagram of FIG. 2. The control apparatus 30 includes a controller 301, a storage 302, a map obtainer 303, an area definer 304, a position determiner 305, a path generator 306, an operation controller 307, and a sensor controller 308.

The controller 301 controls the components of the control apparatus 30 in accordance with a program stored in the storage 302. The process performed by the controller 301 may be performed by the control server 40.

The storage 302 stores information for the components to operate. The storage 302 stores information indicating, for example, the position, the size, and the shape of the scan area 50. The storage 302 also stores the specifications of the 3D sensor 20 (e.g., the measurable distance range and the viewing angle) and the specifications of the robot 10 (e.g., the motion ranges of the arm joints and the rotational speeds of the joints). These items of information can be preset by the user for the control apparatus 30.

Further, the storage 302 stores map information indicating the status of measurement (scanning) performed by the 3D sensor 20 at points (voxels) in the scan area 50. The points in the scan area 50 correspond to different subareas (e.g., cubes). For example, each point in the scan area 50 is the center (center of gravity) of the corresponding subarea. The storage 302 stores, for the subarea corresponding to each point in the scan area 50, map information indicating whether the subarea is a determined-subarea determined to include or determined not to include an object or an undetermined-subarea undetermined to include or undetermined not to include an object. The map information indicates whether the determined-subarea is an object subarea determined to include an object or an empty subarea determined not to include an object. In other words, the map information indicates each point in the scan area 50 being any one of a point with an object, a point without an object, or a point undetermined to be with or without an object.

The map obtainer 303 generates or updates the above map information based on the results of measurement or scanning performed by the 3D sensor 20. More specifically, the map obtainer 303 generates (updates) map information based on the results of measurement of the scan area 50 at multiple measurement positions performed by the 3D sensor 20.

For example, the map obtainer 303 performs coordinate transformation based on the measurement positions to transform 3D information (depth data) at each point on the surface of the object defined in the sensor coordinate system (the coordinate system for the 3D sensor 20) into 3D position information defined in the robot coordinate system (the coordinate system for the robot 10). The map obtainer 303 can thus define the position of the object indicated by the depth data in the robot coordinate system. When the 3D sensor 20 measures the scan area 50 at different measurement positions, the map obtainer 303 can obtain different sets of depth data. This increases the reliability of determination as to whether an object is at each point (in each subarea) in the scan area 50. Based on the reliability, the map obtainer 303 determines (defines) the subarea corresponding to each point to be the undetermined-subarea, the object subarea, or the empty subarea.

The area definer 304 defines (determines) the contact area based on the results of measurement (scanning) performed by the 3D sensor 20. More specifically, the area definer 304 defines, based on the map information, the area including object subareas as the contact area.

The position determiner 305 determines multiple measurement positions (movement positions, or the coordinates and orientations) at which the 3D sensor 20 is placed for measurement. The position determiner 305 may determine multiple candidates for measurement positions and select, from the candidates, measurement positions to which the 3D sensor 20 is movable (to which the robot 10 can move the 3D sensor 20). Each measurement position of the 3D sensor 20 can be identified by, for example, the height or the optical axis direction of the 3D sensor 20. Each measurement position of the 3D sensor 20 can be identified by the posture of the robot 10. The correspondence between the position of the 3D sensor 20 and the posture of the robot 10 is premeasured (predetermined) through calibration.

The path generator 306 (path determiner) generates (determines) a movement path for the robot 10 to move along to cause the 3D sensor 20 to move between the multiple measurement positions determined by the position determiner 305. For example, the path generator 306 determines the movement path along which the 3D sensor 20 moves through all the multiple measurement positions in the shortest time.

The operation controller 307 controls the robot 10 to move the 3D sensor 20 to multiple measurement positions. The operation controller 307 thus shifts the range to undergo measurement performed by the 3D sensor 20 (measurement range) to the range corresponding to each measurement position. The operation controller 307 controls the posture of the robot 10 along the movement path determined by the path generator 306 to control the 3D sensor 20 (specifically, the position and the orientation of the 3D sensor 20).

The sensor controller 308 controls the 3D sensor 20. The sensor controller 308 controls the 3D sensor 20 to perform measurement upon, for example, the robot 10 moving the 3D sensor 20 to each measurement position. The sensor controller 308 can also control the light emission (brightness level) of an illuminator included in the 3D sensor 20.

The control apparatus 30 may be a computer including, for example, a central processing unit (CPU) or a processor, a memory, and a storage. In this case, the components shown in FIG. 2 are implemented by loading a program stored in the storage into the memory and executing the program with the CPU. The computer may be a general-purpose computer such as a personal computer, a server computer, a tablet, or a smartphone or a built-in computer such as an onboard computer. In some embodiments, some or all of the components shown in FIG. 2 may be formed using an application-specific integrated circuit (ASIC) or a field-programmable gate array (FPGA). In some embodiments, some or all of the components shown in FIG. 2 may be implemented by cloud computing or distributed computing.

[Local Scan and Global Scan]

As described above, the scan system 1 according to the present embodiment generates (updates) map information indicating the subarea (corresponding to each point) in the scan area 50 being any one of the object subarea, the empty subarea, or the undetermined-subarea. Each subarea in the scan area 50 is hereafter referred to as a voxel being a unit cubic area.

To measure the scan area 50, the scan system 1 performs (implements) scanning while switching between the local scan for updating map information for a local range and the global scan for updating map information for a global range different from the local range. In the local scan, the scan system 1 performs measurement, for example, in a range overlapping the current measurement range. In the global scan, the scan system 1 performs measurement, for example, in a new range away from the current measurement range.

Figure 3A:
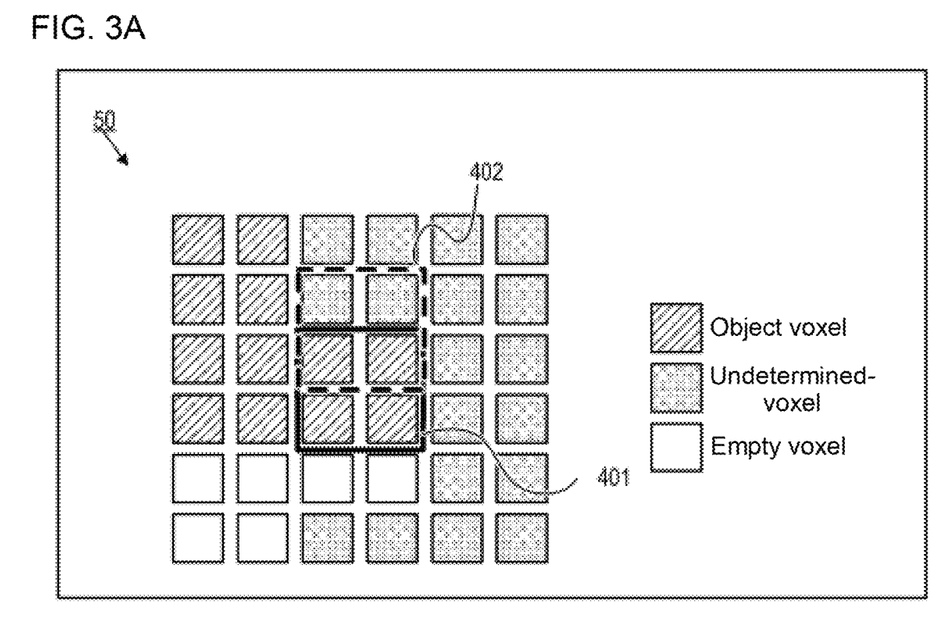
FIG. 3A is a diagram describing a local scan.
Figure 3B:
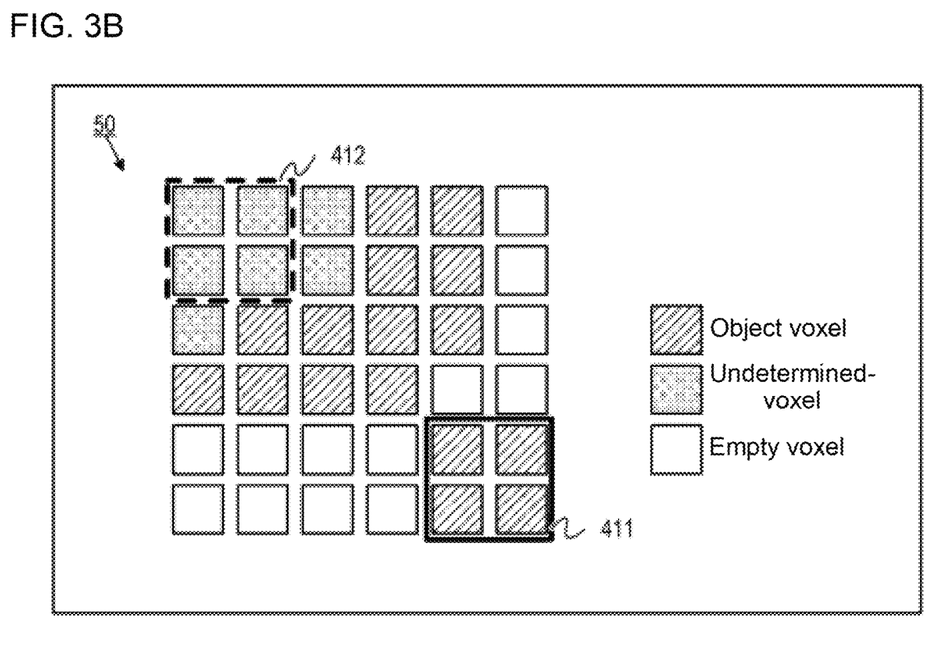
FIG. 3B is a diagram describing a global scan.

The local scan and the global scan will now be described with reference to FIGS. 3A and 3B. FIGS. 3A and 3B each show an array of voxels in the scan area 50. In the map information, the voxels are classified into object subareas (object voxels), undetermined-subareas (undetermined-voxels), or empty subareas (empty voxels). The determined-subareas (determined-voxels) are either object subareas (object voxels) or empty subareas (empty voxels). The scan area 50 includes a 3D array of voxels, although the scan area 50 in FIGS. 3A and 3B each include a 2D array of voxels for ease of explanation.

FIG. 3A is a diagram describing the local scan. FIG. 3A shows a range 401 including four object voxels as the range undergoing measurement performed by the 3D sensor 20 (as the viewing range of the 3D sensor 20). Ranges adjacent to the range 401 include undetermined-voxels undetermined to include or undetermined not to include an object. Thus, the scan system 1 can largely update map information by performing measurement in ranges adjacent to the range 401. To perform measurement in ranges adjacent to the range 401, for example, the 3D sensor 20 determines, as the subsequent measurement range, a range 402 overlapping the range 401 and including object voxels and many undetermined-voxels. The 3D sensor 20 then performs measurement in the range 402. The 3D sensor 20 can thus precisely perform measurement in the current measurement range and its adjacent ranges sequentially.

FIG. 3B is a diagram describing the global scan. FIG. 3B shows a range 411 including four object voxels as the range undergoing measurement performed by the 3D sensor 20 (as the viewing range of the 3D sensor 20). Ranges adjacent to the range 411 include no undetermined-voxels undetermined to include or undetermined not to include an object. Thus, the scan system 1 cannot largely update map information after performing measurement in ranges adjacent to the range 411. The 3D sensor 20 thus determines, as the subsequent measurement range, a range 412 including many undetermined-voxels and not overlapping the range 411. The 3D sensor 20 then performs measurement in the range 412. When the current measurement range or its adjacent ranges do not include many undetermined-voxels, the 3D sensor 20 can thus perform measurement in another range including many undetermined-voxels. This allows more efficient measurement of the scan area 50.

The local scan precisely determines the status of a certain range. The global scan roughly determines the status of a wider range. Without departing from this definition, the scan system 1 in the global scan may determine, as the subsequent measurement range, a range overlapping the range undergoing measurement performed by the 3D sensor 20 (the most recent measurement range). The scan system 1 in the local scan may determine, as the subsequent measurement range, a range not overlapping the range undergoing measurement performed by the 3D sensor 20 (the most recent measurement range).

[Contact Area Defining Process]

Figure 4:
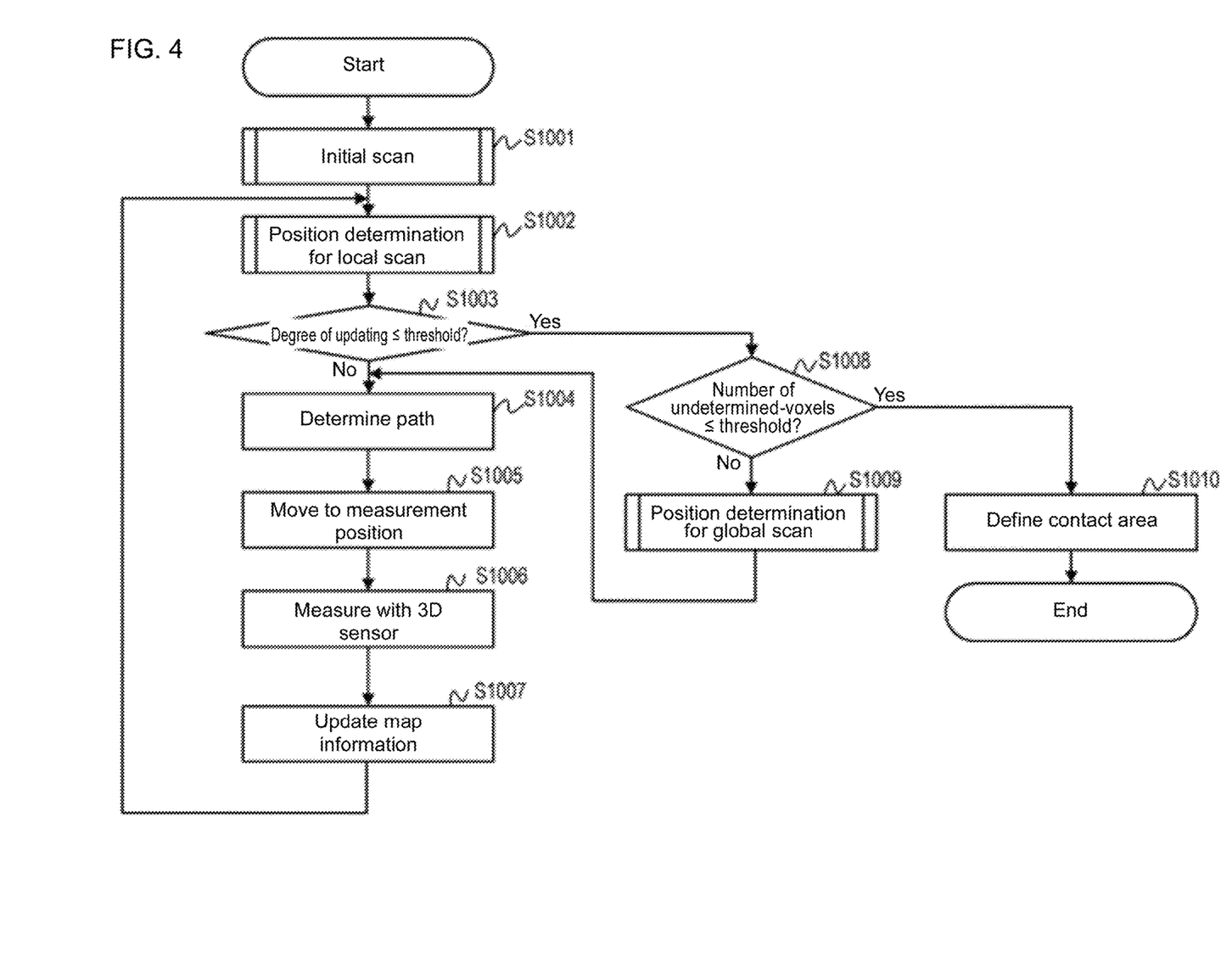
FIG. 4 is a flowchart of a contact area defining process.

A contact area defining process performed by the control apparatus 30 will now be described with reference to FIG. 4. FIG. 4 is a flowchart of the contact area defining process. The processing in the steps in the flowchart of FIG. 4 is performed by the controller 301 executing a program stored in the storage 302 or by other components controlled by the controller 301.

In step S1001, the controller 301 performs the initial scan of the scan area 50 to generate map information as initial information. In the initial scan, the controller 301 performs measurement for roughly determining the status of the scan area 50. The initial scan will be described in detail later with reference to the flowchart of FIG. 5A.

In step S1002, the controller 301 determines one measurement position (orientation) of the 3D sensor 20 for the local scan. The process for determining the measurement position for the local scan will be described in detail later with reference to the flowchart of FIG. 5B.

In step S1003, the controller 301 determines whether the degree of updating of map information in the preceding measurement is less than or equal to a first threshold TH1. In the present embodiment, the degree of updating of map information is the number (amount) of undetermined-voxels that have changed to determined-voxels (object voxels or empty voxels) in the scan area 50. When the degree of updating of map information is less than or equal to the first threshold TH1, the processing advances to step S1008, and otherwise advances to step S1004. For the first step S1003 with no preceding measurement, the processing advances to step S1004.

In step S1003, the controller 301 determines (estimates) whether many undetermined-voxels are to be measured (scanned) with the local scan. When many undetermined-voxels are determined to be measured with the local scan, the processing advances to step S1004 to perform the local scan, and otherwise advances to step S1008 to perform the global scan. The controller 301 may determine, based on the map information, whether a range larger than and including the current measurement range includes a predetermined number of undetermined-voxels or fewer. When the range includes the predetermined number of undetermined-voxels or fewer, the processing advances to step S1008, and otherwise advances to step S1004.

In step S1004, the path generator 306 generates (determines) a movement path for the robot 10 to move along to cause the 3D sensor 20 to move to the measurement position determined in step S1002 or S1009. In this step, the path generator 306 may generate the path that takes the shortest time for movement from the preceding position based on the specifications of the robot 10 (the movable angles and angular velocities of the arm joints).

In step S1005, the operation controller 307 controls the robot 10 to move the 3D sensor 20 to the measurement position determined in step S1002 or S1009. In this step, the operation controller 307 causes the robot 10 to move along the movement path determined in step S1004. More specifically, in step S1005, the operation controller 307 causes the robot 10 to move and thus shifts the range to undergo measurement performed by the 3D sensor 20 (measurement range).

In step S1006, the sensor controller 308 controls the 3D sensor 20 to measure the scan area 50 at the measurement position resulting from the shift, or in other words, to measure the viewing range of the 3D sensor at the measurement position, or the measurement range. The 3D sensor 20 thus obtains 3D information (depth data) in the viewing range. The 3D sensor 20 transmits the obtained 3D information to the control apparatus 30. When the degree of updating of map information is determined to be less than or equal to the first threshold TH1 in the most recent step S1003, the global scan is performed in step S1006, and otherwise the local scan is performed.

In step S1007, the map obtainer 303 updates map information based on the 3D information obtained by the 3D sensor 20 and based on the measurement position at which the 3D sensor 20 has obtained the 3D information.

In step S1008, the controller 301 determines, based on the map information, whether the number of undetermined-voxels (undetermined-subareas) in the scan area 50 is less than or equal to a second threshold TH2. When the number of undetermined-voxels in the scan area 50 is less than or equal to the second threshold TH2, the processing advances to step S1010, and otherwise advances to step S1009. The number of undetermined-voxels may be the volume of undetermined-voxels. The second threshold TH2 may be used to determine substantial completion of the measurement in the scan area 50 and set to, for example, 1 or 2% of the total number of voxels in the scan area 50.

In step S1009, the controller 301 determines the measurement position of the 3D sensor 20 for the global scan. The process for determining the measurement position for the global scan will be described in detail later with reference to the flowchart of FIG. 5C.

In step S1010, the area definer 304 defines, based on the map information, the contact area including an object. More specifically, the area definer 304 defines, as the contact area, the area including object voxels (object subareas) indicated by the map information.

[Initial Scan, S1001]

Figure 5A:
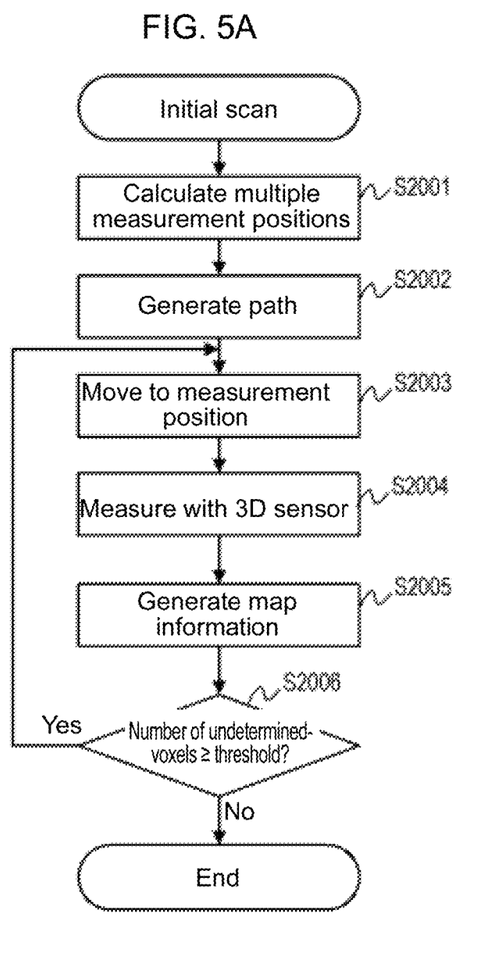
FIG. 5A is a flowchart of an initial scan.

The initial scan performed in step S1001 will now be described with reference to the flowchart of FIG. 5A.

Figure 6A:
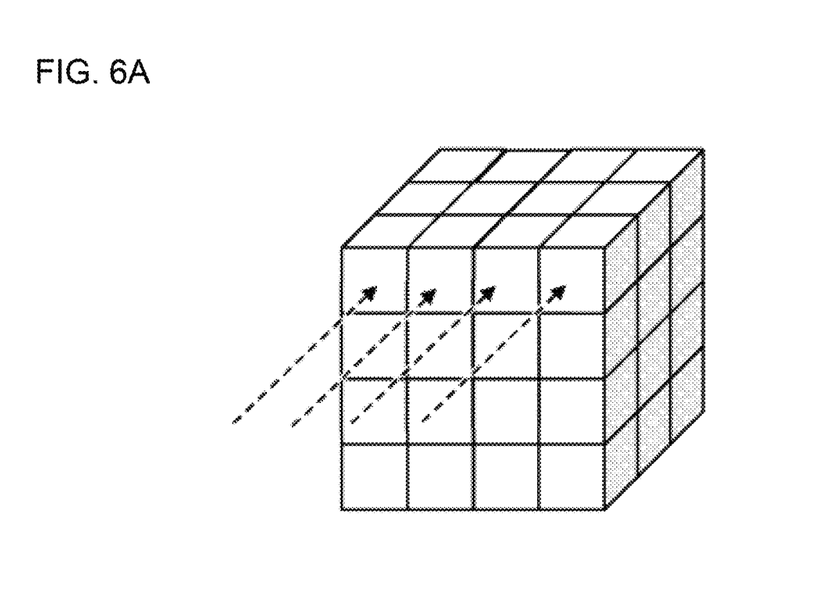
FIGS. 6A and 6B are diagrams each describing the initial scan.
Figure 6B:
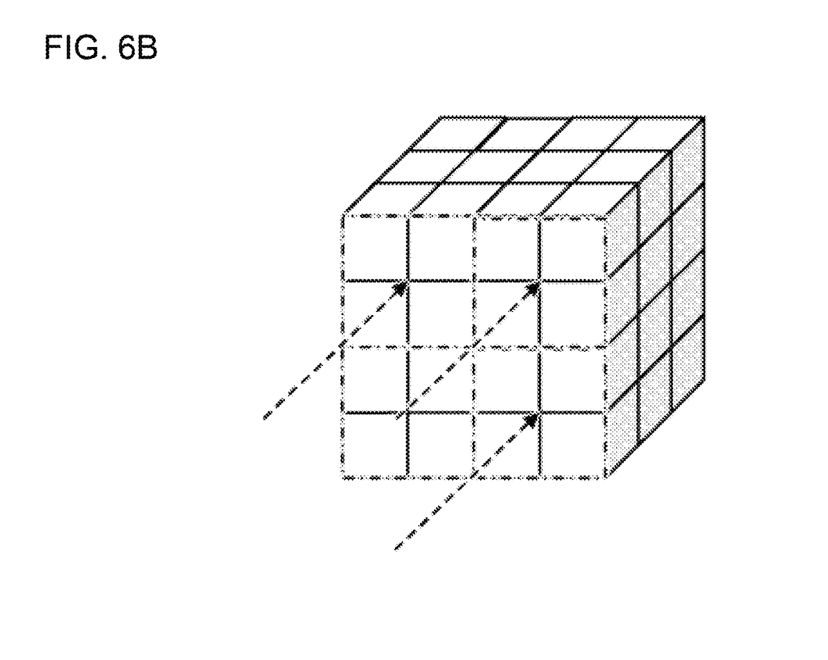

In step S2001, the position determiner 305 calculates (determines) multiple measurement positions for the initial scan. As shown in FIG. 6A, for example, the position determiner 305 determines multiple measurement positions at each of which the 3D sensor 20 performs a single measurement process in a range centered on the corresponding voxel (point). In some embodiments, for example, the position determiner 305 determines multiple measurement positions at each of which the 3D sensor 20 performs measurement in units of a predetermined number (e.g., four) of voxels. Thus, the scan area 50 can be precisely measured in the initial scan. As shown in FIG. 6B, the position determiner 305 may determine multiple measurement positions of the 3D sensor to have each measurement range not overlapping another measurement range. This allows rapid completion of the initial scan with fewer processes. The position determiner 305 may determine any positions (coordinates and orientations) as the multiple measurement positions in a manner other than the above manners.

In step S2002, the path generator 306 generates (determines) a movement path for the robot 10 to move along to cause the 3D sensor 20 to move between the multiple measurement positions determined in step S2001. The movement path includes, for example, information indicating the order in which the 3D sensor 20 moves to the multiple measurement positions. In some embodiments, for example, the path generator 306 determines the movement path for the robot 10 to start moving the 3D sensor 20 from the position farthest of the multiple measurement positions from the robot 10 (specifically, the base of the robot 10 supporting the arm). The path generator 306 determines the movement path for the robot 10 to move along to cause the 3D sensor 20 to move from the starting position through all the measurement positions in the shortest time.

In step S2003, the operation controller 307 controls the robot 10 to move the 3D sensor 20 to one of the multiple measurement positions. In this step, the operation controller 307 controls the posture of the robot 10 along the movement path generated in step S2002. Thus, in step S2003, the operation controller 307 moves the 3D sensor 20, in the order along the movement path, to one of the multiple measurement positions to which the 3D sensor 20 has yet to move.

In step S2004, the sensor controller 308 controls the 3D sensor 20 to measure the scan area 50 at the measurement position resulting from the movement. The 3D sensor 20 thus obtains 3D information (depth data) in the viewing range. The 3D sensor 20 transmits the obtained 3D information to the control apparatus 30.

In step S2005, the map obtainer 303 generates (updates) map information based on the result of measurement and the measurement position in step S2004.

In step S2006, the controller 301 determines, based on the map information, whether the number of undetermined-voxels (undetermined-subareas) in the scan area 50 is greater than or equal to a third threshold TH3. When the number of undetermined-voxels (undetermined-subareas) in the scan area 50 is greater than or equal to the third threshold TH3, the processing advances to step S2003. Otherwise, the processing in the flowchart ends. The third threshold TH3 is used to determine whether the status of the scan area 50 has been roughly determined. Thus, the third threshold TH3 is sufficiently greater than the second threshold TH2. For example, the third threshold TH3 may be any value of 30 to 50% of the total number of voxels in the scan area 50. In some embodiments, the controller 301 may determine whether the number of undetermined-voxels has been changed from step S2001 at a rate (degree of update) greater than or equal to a threshold. In this case, when the number of undetermined-voxels has been changed at a rate greater than or equal to the threshold, the processing in the flowchart ends, and otherwise advances to step S2003. In some embodiments, the processing in the flowchart may end when the controller 301 determines that the 3D sensor 20 has performed measurement at least a predetermined number of times.

[Position Determination for Local Scan, S1002]

Figure 5B:
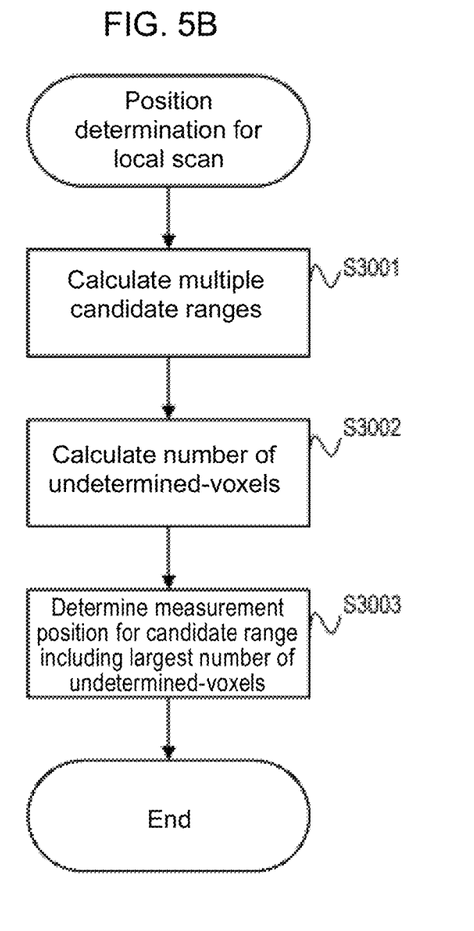
FIG. 5B is a flowchart of a position determination process for the local scan.

The position determination process for the local scan performed in step S1002 will now be described with reference to the flowchart of FIG. 5B.

In step S3001, the position determiner 305 calculates multiple candidate ranges to undergo measurement performed by the 3D sensor 20 that overlaps the current measurement range (the current viewing range of the 3D sensor, or the most recent measurement range). Multiple candidate ranges may include a part of the current measurement range or the current measurement range. For example, the position determiner 305 calculates four candidate ranges resulting from the current measurement range being shifted to the north, south, east, and west by a predetermined distance. The position determiner 305 may calculate candidate ranges resulting from the current measurement range being shifted in any direction other than the north, south, east, or west. Multiple candidate ranges may be adjacent to but not overlapping the current measurement range.

Figure 7A:
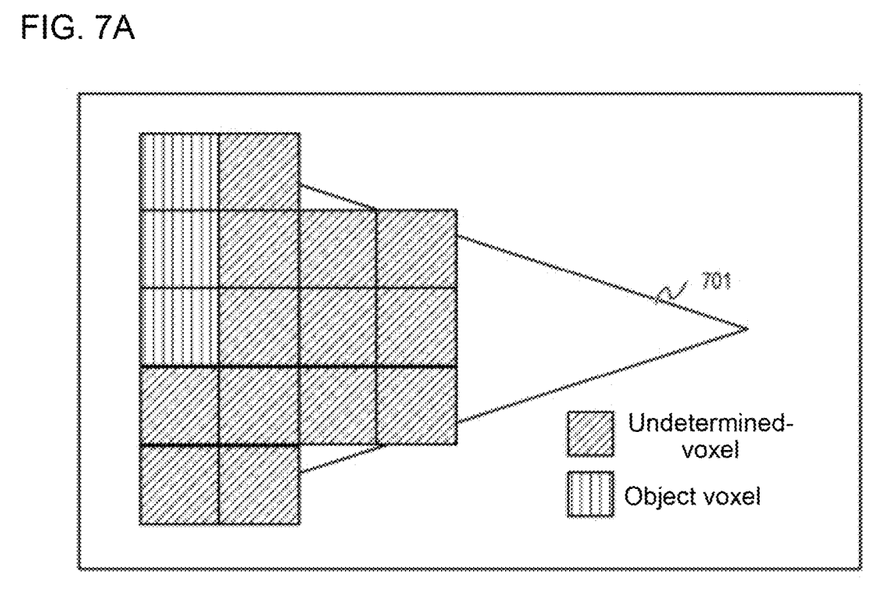
FIGS. 7A and 7B are diagrams each describing calculation of undetermined-voxels.

In step S3002, the position determiner 305 calculates, based on the map information, the number of undetermined-voxels (undetermined-subareas) included in each candidate range. For example, each candidate range extends in the shape of a quadrangular pyramid with the apex at the 3D sensor 20 and the height along the optical axis. FIG. 7A shows a candidate range 701 including 13 undetermined-voxels. In some embodiments, for example, each candidate range may extend in the shape of a circular cone with the apex at the 3D sensor 20 and the height along the optical axis.

Figure 7B:
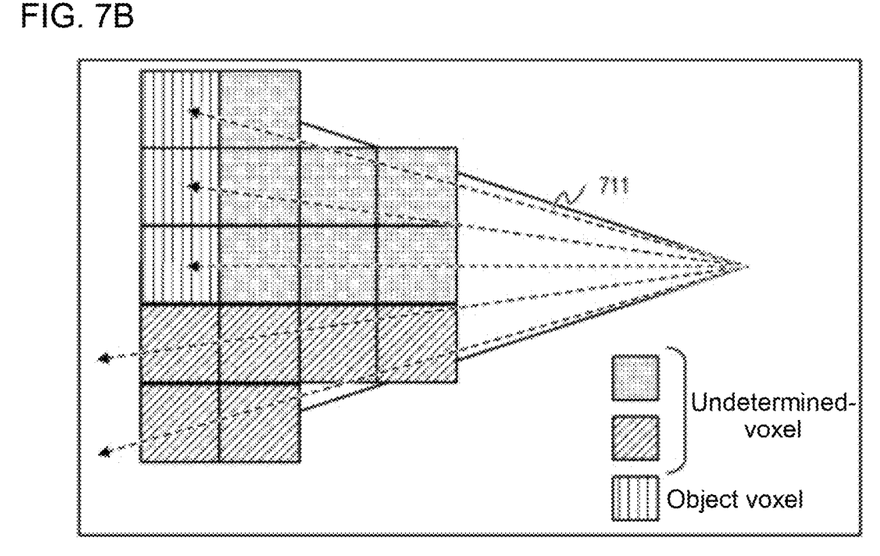

The position determiner 305 may calculate the number of undetermined-voxels located between the 3D sensor 20 and an object voxel (object subarea) included in each candidate range. For example, FIG. 7B shows a candidate range 711 including seven such undetermined-voxels. With no object voxel located farther than undetermined-voxels from the 3D sensor 20, for example, the 3D sensor 20 cannot use an object voxel as a reference for measurement and may fail to determine whether the undetermined-voxels are object voxels or empty voxels. For efficient measurement, the position determiner 305 may simply calculate the number of undetermined-voxels located between the 3D sensor 20 and an object voxel (object subarea) in each candidate range. In this case, undetermined-voxels located frontward from object voxels (undetermined-voxels located between the 3D sensor 20 and an object voxel) are determined to be empty voxels in subsequent step S1007.

In step S3003, the position determiner 305 determines, as the measurement position, the position (the coordinates and orientation) at which measurement is performed for the candidate range that includes the largest number of undetermined-voxels calculated in step S3002. In other words, the position determiner 305 determines, as the range to undergo measurement performed by the 3D sensor 20, the candidate range including the largest number of undetermined-voxels calculated in step S3002. When the 3D sensor 20 performs measurement in such a candidate range, the map information can be largely updated.

[Position Determination for Global Scan, S1009]

Figure 5C:
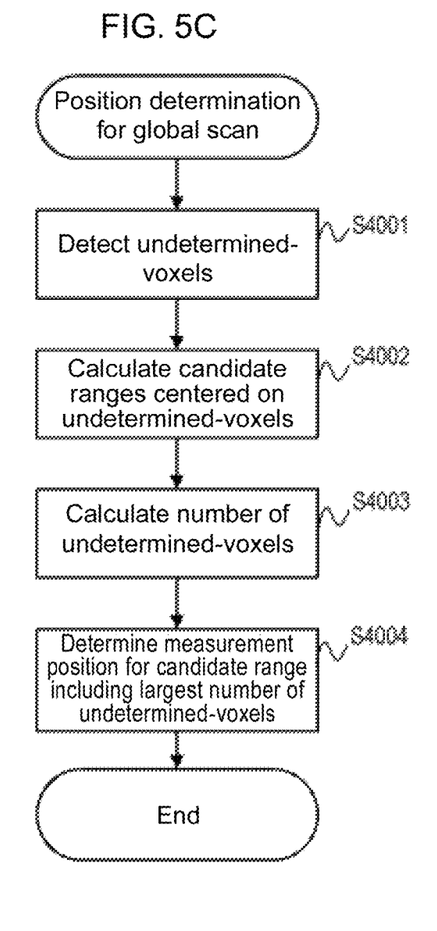
FIG. 5C is a flowchart of a position determination process for the global scan.

The position determination process for the global scan performed in step S1009 will now be described with reference to the flowchart of FIG. 5C.

In step S4001, the position determiner 305 detects, based on the map information, undetermined-voxels (undetermined-subareas) in the scan area 50.

In step S4002, the position determiner 305 calculates (determines) multiple candidate ranges to undergo measurement performed by the 3D sensor 20. Each candidate range is centered on the detected corresponding undetermined-voxel (to have the undetermined-voxel aligned with the optical axis of the 3D sensor 20). In step S4002, the position determiner 305 calculates, as the multiple candidate ranges, ranges that are farther from the range currently undergoing measurement performed by the 3D sensor 20 than the multiple candidate ranges calculated in step S3001.

In step S4003, the position determiner 305 calculates the number of undetermined-voxels in each candidate range. As in step S3002, the position determiner 305 may calculate the number of undetermined-voxels located between the 3D sensor 20 and an object voxel (object subarea) included in each candidate range.

In step S4004, the position determiner 305 determines, as the measurement position, the position (the coordinates and orientation) at which measurement is performed for the candidate range that includes the largest number of undetermined-voxels calculated in step S4003. In other words, the position determiner 305 determines, as the range to undergo measurement performed by the 3D sensor 20, the candidate range including the largest number of undetermined-voxels calculated in step S4003. When the 3D sensor 20 performs measurement in such a candidate range, the map information can be largely updated.

The 3D sensor 20 measures voxels included in its viewing range. The position (the coordinates and orientation) of the 3D sensor 20 uniquely corresponds to its viewing range. Thus, in step S4002, the position determiner 305 determines multiple candidates for measurement positions (candidate positions) at each of which undetermined-voxel are included in the viewing range of the 3D sensor 20. In steps S4002 and S4003, the position determiner 305 determines, as the candidate range to undergo measurement, the range of the viewing ranges of the 3D sensor 20 at the multiple candidate positions that includes the largest number of undetermined-voxels. In this case, the range that includes the largest number of undetermined-voxels may also be referred to as the range that includes the largest number of undetermined-subareas located between the 3D sensor 20 and an object voxel.

In this manner, the scan system 1 switches between the global scan and the local scan depending on the degree of updating of undetermined-subareas. More specifically, when many undetermined-subareas can be measured in the current measurement range (measurement range) or its adjacent ranges, the scan system 1 performs measurement in such ranges. Otherwise, the scan system 1 performs measurement in a range away from the current measurement range. Thus, the 3D sensor 20 can be placed at positions that allow effective measurement of the scan area 50. The structure also allows efficient updating of map information for determining the status of the scan area. This allows efficient measurement of the scan area.

In the present embodiment, as shown in the flowchart of FIG. 4, the map obtainer 303 updates map information in step S1007 for every measurement (scanning) process performed by the 3D sensor 20 in step S1006. In some embodiments, the map obtainer 303 may update map information for every predetermined number of local scans or global scans performed by the 3D sensor 20.

For example, in step S1002 or S1009, the controller 301 determines multiple measurement positions. Then, for each measurement position, the processing in steps S1004 to S1006 is performed to determine the movement path for the robot 10 and move the 3D sensor 20 to perform measurement. The map obtainer 303 then updates map information based on the results of measurement at the multiple measurement positions performed by the 3D sensor 30.

In some embodiments, for example, when the degree of updating of map information is greater than the first threshold TH1 (No in step S1003), the map obtainer 303 may update map information after multiple local scans. Otherwise (Yes in step S1003), the map obtainer 303 may update map information after a single global scan. In some embodiments, when the degree of updating of map information is greater than the first threshold TH1, the map obtainer 303 may update map information after multiple local scans. Otherwise, the map obtainer 303 may update map information after a single global scan and subsequent multiple local scans.

In the present embodiment, the controller 301 determines whether the degree of updating of map information is less than or equal to the first threshold TH1 for every updating process for map information performed by the map obtainer 303. In some embodiments, the controller 301 may determine whether the degree of updating of map information is less than or equal to the first threshold TH1 for every multiple updating processes. In the local scan performed by the 3D sensor 20, for example, the controller 301 may determine, in step S1003, whether the degree of updating of map information is less than or equal to the first threshold TH1 after multiple updating processes for map information performed through the repeated processing in steps S1002 and S1004 to S1007. In this case, the controller 301 may obtain the degrees of updating of map information through multiple updating processes in step S1007 and determine, in step S1003, whether the representative value (the average, median, or mode) of the degrees of update is less than or equal to the first threshold TH1. In other words, the controller 301 may obtain the degrees of updating of map information through multiple updating processes during the period from the determination in the preceding step S1003 to the current step S1003, and determine whether the representative value (the average, median, or mode) is less than or equal to the first threshold TH1.

In some embodiments, the 3D sensor 20 captures 2D images using a camera included in the 3D sensor 20 while illuminating the scan area 50 using the illuminator included in the 3D sensor 20, and uses the 2D images to measure the scan area 50. For example, the 3D sensor 20 captures multiple 2D images with different brightness (exposure) levels that are then combined into a high dynamic range (HDR) image. In this case, the 3D sensor 20 captures multiple 2D images with different brightness (exposure) levels at a single measurement position (for a single measurement range) by changing the camera exposure time, the camera gain, or the illuminance of the illuminator to control the brightness levels of 2D images. The multiple captured 2D images are used to produce 3D information, which is then used to update map information by the map obtainer 303. The camera exposure time, the camera gain, and the illuminance of the illuminator in the 3D sensor 20 are controlled by the sensor controller 308.

When the degree of updating of map information is greater than the first threshold TH1, for example, the map obtainer 303 updates map information using 3D information based on an image resulting from combining 2D images captured at a measurement position in the local scan. The 2D images include a 2D image captured at a first brightness level and a 2D image captured at a second brightness level (higher than the first brightness level). When the degree of updating of map information is less than or equal to the first threshold TH1, the map obtainer 303 updates map information using 3D information based on an image resulting from combining 2D images captured at a measurement position in the global scan. The 2D images include a 2D image captured at a first brightness level and a 2D image captured at a second brightness level.

In some embodiments, for example, when the degree of updating of map information is greater than the first threshold TH1, the map obtainer 303 may update map information using 3D information based on a 2D image captured at a first brightness level at a measurement position in the local scan, and may further update map information using 3D information based on a 2D image captured at the second brightness level at the same measurement position.

In the present embodiment, the controller 301 selects one of the local scan or the global scan to be performed based on whether the degree of updating of map information is less than or equal to the first threshold TH1 in step S1003. In some embodiments, the controller 301 may select one of the local scan or the global scan to be performed based on information other than the degree of updating of map information. For example, the controller 301 may perform control to cause the global scan to occur immediately after the local scan, and to cause the local scan to occur immediately after the global scan. In other words, the controller 301 may perform control to alternate the local scan and the global scan. In some embodiments, the controller 301 may perform control to cause a single global scan to occur for every multiple local scans, or to cause multiple local scans to occur for every multiple global scans.

[First Modification]

In the first embodiment, the scan system 1 uses the number of undetermined-voxels included in each candidate range determined in steps S3001 and S4002 to determine the range to undergo measurement performed by the 3D sensor 20 (the measurement range or the candidate range). A scan system 1 in the present modification uses, instead of the number of undetermined-voxels, entropy indicating the degree of completion of measurement (scanning) to determine the candidate range to undergo measurement performed by the 3D sensor 20.

In the present modification, the map information includes scores P each having any value from 0 to 1 and indicating the reliability (probability or likelihood) of determination as to whether an object is included in the corresponding voxel. A higher score P indicates a higher possibility that the voxel with the score P is an object voxel. A lower score P indicates a higher possibility that the voxel with the score P is an empty voxel. The score P being closer to 0 or 1 indicates higher reliability of determination as to whether an object is included in the voxel. The score P being closer to 0.5 indicates lower reliability of determination as to whether an object is included in the voxel.

The map obtainer 303 can use the score P to determine each voxel to be any one of the undetermined-voxel, the object voxel, or the empty voxel. For a voxel with the score P lower than or equal to 0.3, for example, the map obtainer 303 can determine the voxel to be the empty voxel. For a voxel with the score P higher than 0.3 and lower than 0.7, the map obtainer 303 can determine the voxel to be the undetermined-voxel. For a voxel with the score P higher than or equal to 0.7, the map obtainer 303 can determine the voxel to be the object voxel. The above thresholds, such as 0.3 and 0.7, may be set as appropriate by the user.

In the present modification, the control apparatus 30 uses the score P to perform the position determination processes for the local scan and the global scan. The present modification differs from the first embodiment in the processing in steps S3002, S3003, S4003, and S4004 alone. The processing in these steps will be described in detail below, and the processing in the other steps will not be described.

In steps S3002 and S4003, the position determiner 305 calculates the entropy for each candidate range based on the score P. A certain range has higher entropy when the range has a lower degree of completion of measurement (or when the range has lower reliability of determination as to whether an object is included in the range). More specifically, the entropy of a voxel can be calculated using Formula 1 below. In other words, a voxel with the score P closer to 0.5 has a greater entropy value. The entropy of a certain range is the sum or the representative value (the average, median, or mode) of entropy of all voxels in the range.

$$\text{Entropy} = P\log(P) - (1-P)\log(1-P) \qquad \text{Formula 1}$$

In steps S3003 and S4004, the position determiner 305 determines, as the measurement position, the position (the coordinates and orientation) at which measurement is performed for the candidate range with the highest entropy of the multiple candidate ranges.

In the present modification, the measurement positions for the local scan and the global scan can be determined based on the reliability of determination as to whether an object is included in each voxel. The measurement positions can thus be determined appropriately based on more precise information than in the first embodiment.

[Second Modification]

In the process for determining the measurement position for the global scan, the control apparatus 30 may obtain the mobility of the 3D sensor 20 at each measurement position for the corresponding candidate range, and may use the mobility to determine the candidate range (measurement range) corresponding to the measurement position as the destination of the 3D sensor 20.

More specifically, in step S4003, the position determiner 305 calculates, in addition to the number of undetermined-voxels, the mobility of the robot 10 with the 3D sensor 20 being placed at the measurement position to perform measurement in each candidate range. In the present modification, the position determiner 305 calculates a manipulability value K as an index of the mobility (easiness of movement) of the robot 10. More specifically, the manipulability value K is an index of the degree to which the end of the robotic arm body in a certain posture can freely change its position or posture. A greater manipulability value K for a posture indicates higher mobility from the posture. A manipulability value K(q) can be calculated using Formula 2 below, where q is the joint angle (joint value) of the robot 10, and J is the Jacobian matrix.

[Number 1]

$$K(q) = \sqrt{\det(J(q)J^T(q))} \qquad \text{Formula 2}$$

In step S4003, the position determiner 305 determines the candidate range corresponding to the measurement position as the destination of the 3D sensor 20 based on the number of undetermined-voxels and the manipulability value K for each candidate range. For example, the position determiner 305 determines, as the candidate range corresponding to the measurement position as the destination of the 3D sensor 20, the range of the multiple candidate ranges that has the greatest product or sum of the number of undetermined-voxels and the manipulability value K.

The mobility of the robot 10 may be indicated by any index other than the manipulability value. For example, the mobility may be indicated by an index that is smaller when the arm joint angles of the robot 10 are closer to the maximum or minimum value (or when the configuration of the robot 10 is closer to a singular configuration).

In this manner, the candidate range corresponding to the measurement position is determined as the destination of the 3D sensor 20. The 3D sensor 20 can thus move between multiple measurement positions smoothly. This structure performs more measurement processes in a shorter time, and thus allows earlier completion of measurement of the entire scan area 50.

Other Embodiments

The local scan may be performed to generate (update) map information for a local range, and the global scan may be performed to generate (update) map information for a global range. In some embodiments, for example, the range to undergo scanning in the global scan may be wider than in the local scan. In some embodiments, the range to undergo scanning in the local scan may be determined based on the entropy indicating the reliability of determination as to whether an object is included in the range, whereas the range to undergo scanning in the global scan may be determined based on the mobility of the robot for moving the 3D sensor. In some embodiments, the range to undergo scanning in the local scan may be determined based on the number of undetermined-subareas located between the 3D sensor and an object subarea in the viewing range of the 3D sensor, whereas the range to undergo scanning in the global scan may be determined based on the number of undetermined-subareas in the viewing range of the 3D sensor.

The scope of the claims is construed without being limited to the features described in the embodiments described above. The scope of the claims is construed to include the scope understandable by those skilled in the art to solve intended issues in view of the common technical knowledge at the time of filing.

APPENDIX 1

A control apparatus (30) for a robot (10) including a three-dimensional sensor (20), the control apparatus (30) comprising:
an operation controller (307) configured to control the robot (10) to shift a measurement range of the three-dimensional sensor (20) in a scan area (50); and
a map obtainer (303) configured to update map information based on a result of measurement performed by the three-dimensional sensor (20), the map information indicating a scan status at each of a plurality of points in the scan area (50),
wherein the operation controller (307) performs first scanning in which the measurement range of the three-dimensional sensor (20) is shifted to update map information about a local range in the scan area (50), and performs second scanning in which the measurement range of the three-dimensional sensor (20) is shifted away from the local range to update map information about a range different from the local range for which the first scanning is performed to update map information.

APPENDIX 2

A control method for a robot (10) including a three-dimensional sensor (20), the control method comprising:
(S1005) controlling the robot (10) to shift a measurement range of the three-dimensional sensor (20) in a scan area (50); and
(S1007) updating map information based on a result of measurement performed by the three-dimensional sensor (20), the map information indicating a scan status at each of a plurality of points in the scan area (50),
wherein (S1005) the controlling the robot (10) includes performing first scanning in which the measurement range of the three-dimensional sensor (20) is shifted to update map information about a local range in the scan area (50) and performing second scanning in which the measurement range of the three-dimensional sensor (20) is shifted away from the local range to update map information about a range different from the local range for which the first scanning is performed to update map information.

DESCRIPTION OF SYMBOLS 1 scan system
10 robot
20 3D sensor
30 control apparatus
40 control server
50 scan area
60 network
301 controller
302 storage
303 map obtainer
304 area definer
305 position determiner
306 path generator
307 operation controller
308 sensor controller

The invention claimed is:

1. A control apparatus for a robot including a three-dimensional sensor, the control apparatus comprising:
an operation controller configured to control the robot to shift a measurement range of the three-dimensional sensor in a scan area; and
a memory configured to store computer-executable instructions and a processor configured to execute the computer-executable instructions stored in the memory to cause the control apparatus to update map information based on a result of measurement performed by the three-dimensional sensor, the map information indicating a scan status at each of a plurality of points in the scan area,
wherein the operation controller performs first scanning in which the measurement range of the three-dimensional sensor is shifted to update map information about a local range in the scan area, and performs second scanning in which the measurement range of the three-dimensional sensor is shifted away from the local range to update map information about a range different from the local range for which the first scanning is performed to update map information,
the map information indicates, as the scan status, at least whether a subarea corresponding to each of the plurality of points in the scan area is a determined-subarea determined to include or determined not to include an object or an undetermined-subarea undetermined to include or undetermined not to include an object,
the operation controller performs the first scanning in response to a degree of updating of the map information being greater than a threshold, and performs the second scanning in response to the degree of updating being less than or equal to the threshold, and
the degree of updating includes a number of undetermined-subareas updated to determined-subareas.

2. The control apparatus according to claim 1, wherein in the first scanning, the operation controller performs at least one of shifting the measurement range of the three-dimensional sensor to a range overlapping a most recent measurement range, shifting the measurement range of the three-dimensional sensor based on entropy indicating reliability of determination as to whether an object is included in the measurement range, or shifting the measurement range of the three-dimensional sensor based on a number of undetermined-subareas located between the three-dimensional sensor and an object subarea in a viewing range of the three-dimensional sensor, where the undetermined-subarea is a subarea undetermined to include or undetermined not to include an object in the scan area, and the object subarea is a subarea determined to include an object in the scan area.

3. The control apparatus according to claim 1, wherein in the second scanning, the operation controller performs at least one of shifting the measurement range of the three-dimensional sensor to a range not overlapping a most recent measurement range, shifting the measurement range of the three-dimensional sensor based on a number of undetermined-subareas in a viewing range of the three-dimensional sensor, where the undetermined-subarea is a subarea undetermined to include or undetermined not to include an object in the scan area, or shifting the measurement range of the three-dimensional sensor based on mobility of the robot to move the three-dimensional sensor.

4. The control apparatus according to claim 1, wherein in the first scanning, the operation controller shifts the measurement range of the three-dimensional sensor to a range overlapping a most recent measurement range, and in the second scanning, the operation controller shifts the measurement range of the three-dimensional sensor to a range not overlapping the most recent measurement range.

5. The control apparatus according to claim 1, wherein in the first scanning, the operation controller shifts the measurement range of the three-dimensional sensor to a range including a largest number of undetermined-subareas of a plurality of ranges each overlapping a most recent measurement range.

6. The control apparatus according to claim 1, wherein the map information includes information about reliability of determination as to whether an object is included in the subarea corresponding to each of the plurality of points, in the first scanning, the operation controller shifts the measurement range of the three-dimensional sensor to a range with a highest representative value of entropy of a plurality of ranges each overlapping a most recent measurement range, and the entropy has a greater value for the reliability having a value closer to 0.5.

7. The control apparatus according to claim 6, wherein the representative value is an average, a median, or a mode.

8. The control apparatus according to claim 1, wherein in the second scanning, the operation controller shifts the measurement range of the three-dimensional sensor based on a number of undetermined-subareas in a viewing range of the three-dimensional sensor at each of a plurality of candidate positions.

9. The control apparatus according to claim 8, wherein in the second scanning, the operation controller shifts the measurement range of the three-dimensional sensor to a viewing range of the three-dimensional sensor including a largest number of undetermined-subareas of a plurality of viewing ranges of the three-dimensional sensor at the plurality of candidate positions.

10. The control apparatus according to claim 8, wherein the map information indicates whether the determined-subarea is an object subarea determined to include an object or an empty subarea determined not to include an object, and in the second scanning, the operation controller shifts the measurement range of the three-dimensional sensor to, of a plurality of viewing ranges of the three-dimensional sensor at the plurality of candidate positions, a viewing range of the three-dimensional sensor including a largest number of undetermined-subareas between the three-dimensional sensor and an object subarea.

11. The control apparatus according to claim 8, wherein in the second scanning, the operation controller shifts the measurement range of the three-dimensional sensor further based on mobility of the robot to move the three-dimensional sensor.

12. The control apparatus according to claim 1, wherein the processor is configured to execute the computer-executable instructions stored in the memory to cause the control apparatus to obtain the map information as initial information based on a result of measurement performed by the three-dimensional sensor for a subarea corresponding to each of the plurality of points in the scan area.

13. The control apparatus according to claim 1, wherein the processor is configured to execute the computer-executable instructions stored in the memory to cause the control apparatus to obtain the map information as initial information based on a result of measurement performed by the three-dimensional sensor for a plurality of ranges in the scan area not overlapping each other.

14. A robot, comprising:
the control apparatus according to claim 1; and
a three-dimensional sensor configured to measure a scan area.

15. A control method for a robot including a three-dimensional sensor, the control method comprising:
controlling the robot to shift a measurement range of the three-dimensional sensor in a scan area; and
updating map information based on a result of measurement performed by the three-dimensional sensor, the map information indicating a scan status at each of a plurality of points in the scan area,
wherein the controlling the robot includes performing first scanning in which the measurement range of the three-dimensional sensor is shifted to update map information about a local range in the scan area and performing second scanning in which the measurement range of the three-dimensional sensor is shifted away from the local range to update map information about a range different from the local range for which the first scanning is performed to update map information,
the map information indicates, as the scan status, at least whether a subarea corresponding to each of the plurality of points in the scan area is a determined-subarea determined to include or determined not to include an object or an undetermined-subarea undetermined to include or undetermined not to include an object,
the controlling the robot includes performing the first scanning in response to a degree of updating of the map information being greater than a threshold, and performing the second scanning in response to the degree of updating being less than or equal to the threshold, and the degree of updating includes a number of undetermined-subareas updated to determined-subareas.

16. A non-transitory computer readable medium storing a program for causing a computer to perform operations included in the control method according to claim 15.

* * * * *